United States Patent [19]

Olson

[11] Patent Number: 5,034,038

[45] Date of Patent: Jul. 23, 1991

[54] SEPARATOR FOR VACUUM PUMP LOADING SYSTEM

[75] Inventor: Donald C. Olson, Erie, Pa.

[73] Assignee: Alliance Plastics, Erie, Pa.

[21] Appl. No.: 522,579

[22] Filed: May 14, 1990

[51] Int. Cl.[5] .......... B01D 47/00

[52] U.S. Cl. .......... 55/227; 55/242; 55/255; 55/257.1

[58] Field of Search .......... 55/225, 227, 229, 242, 55/255, 256, 257.1

[56] References Cited

U.S. PATENT DOCUMENTS

| | | | |
|---|---|---|---|
| 2,239,595 | 4/1941 | Cummings | 55/227 |
| 2,911,289 | 11/1959 | Forry | 55/255 |
| 3,183,645 | 11/1961 | Teller | 55/20 |
| 3,768,234 | 10/1973 | Hardison | 55/229 |
| 3,971,642 | 7/1976 | Perez | 55/223 |
| 4,043,771 | 8/1977 | Anand | 55/93 |
| 4,762,686 | 8/1988 | Lehto | 422/168 |
| 4,968,336 | 11/1990 | Reimanis et al. | 55/227 |

*Primary Examiner*—Bernard Nozick
*Attorney, Agent, or Firm*—Oliff & Berridge

[57] ABSTRACT

A separator for a vacuum loading system is located in a flow path of an air/particulate mixture between a loading system and a vacuum pump, the vacuum pump drawing the air/particulate mixture from the loading system through a liquid chamber to trap particulate matter in a liquid while the air in the air/particulate mixture is drawn through the liquid and into an air chamber for return to the vacuum pump. The separator also includes a level detection device within the reservoir for detecting a predetermined level of the liquid in the reservoir and outputting an inlet signal when the actual liquid level is less than the predetermined level; a drain valve in the liquid chamber of the reservoir for selectively draining the liquid filter from the reservoir; an inlet operatively communicating with the level detecting device for introducing the liquid into the reservoir in response to detection of the inlet signal; and a vacuum cutoff operatively communicating with the level detection device for disabling the vacuum pump in response to detection of the inlet signal. A control periodically opens the drain valve for a predetermined time period to drain the liquid from the reservoir. The draining actuates the level detection device to output the inlet signal to open the inlet and activate the vacuum cutoff. The drain valve opens upon completion of the predetermined time period. The vacuum is restarted and the inlet closes when the actual liquid level returns to the predetermined level.

14 Claims, 4 Drawing Sheets

SEPARATOR FOR VACUUM PUMP LOADING SYSTEM

BACKGROUND OF THE INVENTION

A. Field of the Invention

The invention relates to a separator for a vacuum pump loading system. More particularly, the invention relates to a separator for a vacuum pump loading system in which an air/particulate mixture separated through a liquid to remove particulates, and the separator is automatically and periodically cleaned and supplied with fresh liquid. While the invention is applicable to any vacuum pump loading system, it is most advantageously utilized in a vacuum pump loading system for transferring resin or plastic-type pellets from any one of several hoppers to any one of several manufacturing machines for forming a plastic article from the pellets.

B. Discussion of Related Art

Filters for removal of particulates or contaminants from air or other gases by forcing the gases through a dry filter (e.g., a mesh or fibrous material) or a wet both (e.g., an aqueous solution) are known in the art. References such as U.S. Pat. Nos. 4,762,686 to Lehto, 3,971,642 to Perez and 3,183,645 to Teller disclose such systems.

A common problem with dry or wet-type separators, such as those above, is that theY all require periodic cleaning to remove the separator material which after some time contains a large amount of particulate matter which reduces the efficiency of the separator. Further, if the particulate matter begins to accumulate in the separator and then begins to pass through the separator, the particulates may cause irreparable harm to the system requiring the separator. Such periodic cleaning has previously been done by so-called "backflow" methods where a blast of pressure is directed in a reverse direction to unclog dry separators of any particulate matter. Such a system when used with a dry-type, separator causes an unnecessary mess due to particles or contaminants being blown out of the device into the environment or into a special receptacle. Such a system usually will still clog after a period of time and requires a manual teardown and resasembly of the separator to restore the proper flow of gas through the system. Wet separators require periodic shutdown of the system to drain and clean the separator and then replenish the separator material.

A need has arisen for a separator system which provides automatic periodic cleaning of the separator and replacement of dirty separator material to restore proper operation of the separator while minimizing downtime and thus increasing production capabilities. More specifically, a need has arisen for such a separator system which is simple in construction and will reliably, automatically and periodically maintain a separating system.

SUMMARY OF THE INVENTION

It is an object of the present invention to provide a vacuum separator system which can automatically be cleaned without any operator intervention.

It is a further object of the present invention to provide a vacuum separator system which minimizes the amount of airborne contaminants released into the environment during operation and cleaning of the separator.

It is another object of the present invention to provide a vacuum separator system which is electronically activated to start and finish a cleaning cycle by a preprogrammed timer.

It is another object of the present invention to provide a vacuum separator system which comprises at least one spray nozzle for washing down the walls of the system to flush out any contaminants while providing a supply of fresh-separator material.

It is another object of the present invention to provide a vacuum separator system which comprises an electronically actuated valve to allow used separator media in the system to be drained and to provide a stop for allowing new separator media to remain in the system.

It is another object of the present invention to provide a vacuum separator system which will automatically disconnect the vacuum source during a cleaning cycle and automatically reconnect the vacuum source upon completion of the cleaning cycle.

It is another object of the present invention to provide a vacuum separator system which allows for increased production time, reduced maintenance costs and increased machine reliability.

It is another object of the present invention to provide a vacuum separator system which can be used as a separator for a plastic resin vacuum loading system.

These and other objects and advantages are obtained by the inventive separator for a vacuum loading system. The separator is located in a flow path of an air/particulate mixture between a loading system and a vacuum pump. The separator includes a closed reservoir defining an air chamber communicating with the vacuum pump and a liquid chamber communicating with the loading system, the vacuum pump drawing the air/particulate mixture from the loading system through an inlet in the liquid chamber to trap particulate matter in a liquid contained in the liquid chamber, while the air in the air/particulate mixture is drawn through the liquid and into the air chamber for withdrawal from an air outlet of the reservoir and return to the vacuum pump. The separator also includes level detection means within the reservoir for detecting a predetermined level of the liquid in the reservoir and outputting an inlet signal when the actual liquid separator level is less than the predetermined level; vacuum cutoff means operatively communicating with the level detecting means for disabling the vacuum pump in response to detection of the inlet signal; drain valve means in the liquid chamber of the reservoir for selectively draining the liquid from the reservoir; and inlet means operatively communicating with the level detecting means for introducing the liquid into the reservoir in response to detection of the inlet signal. A control means periodically opens the drain valve means for a predetermined time period to drain the liquid from the reservoir. The draining thus actuates the level detection means to output the inlet signal to open the inlet means and activate the vacuum cutoff means to disable the vacuum pump. The drain valve means closes upon completion of the predetermined time period. The inlet means closes and the vacuum pump is restarted when the predetermined level of the liquid filter is reestablished.

BRIEF DESCRIPTION OF THE DRAWINGS

The invention will be described in detail with reference to the preferred embodiments thereof as illustrated in the appended drawings wherein like elements bear reference numerals and wherein.

DETAILED DESCRIPTION OF THE PREFERRED EMBODIMENTS

Figure 3:
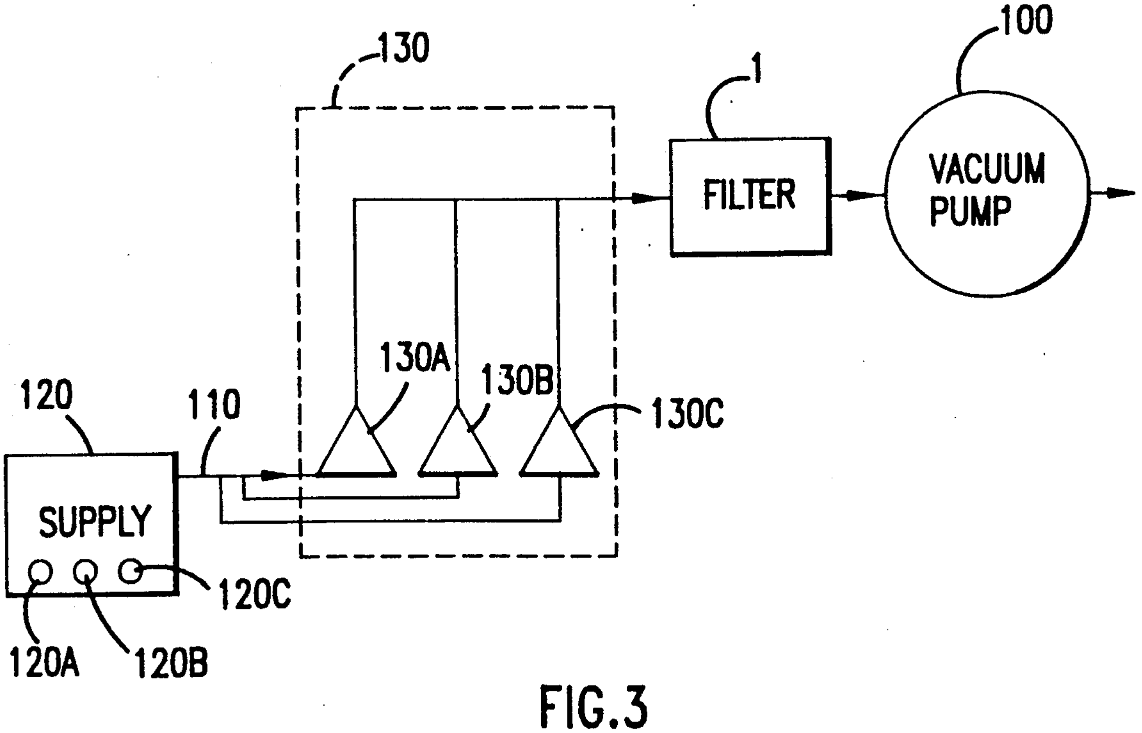
FIG. 3 is a schematic illustration of the separator in a vacuum loading system for transferring plastic resin pellets from a supply to a loading system.

The separator for the vacuum loading system of the present invention is applicable to any system utilizing a vacuum for transport of materials from a supply or hopper to a device for processing the material. The separator is preferably used in a vacuum loading system for transporting plastic resin pellets from a supply area to a loading system for machines which process the pellets into a plastic article, such as a plastic plug, cap or cover. Such system is schematically illustrated in FIG. 3 wherein a vacuum pump 100 communicates with a conduit 110 extending from a plastic pellet supply 120 to a loading system 130. The loading system 130 may serve one or more processing devices 130A, 130B, 130C. Similarly, the plastic pellet supply 120 may include one or more storage bins 120A, 120B, 120C of pellets of different colors, properties and/or size.

The pellets from the supply are preferably drawn by the vacuum of air created in the conduit 110 from the supply 120 toward the loading system 130 where the pellets are directed toward the appropriate processing device 130A, 130B, 130C. The vacuum of air, however, picks up particulate debris from the pellet supply to form an air/particulate mixture, which if unseparated, could disrupt the operation of the vacuum pump 100. Accordingly, a, separator 1 is located in the air flow path between the loading system 130 and the vacuum pump 100 to trap particulate matter.

Figure 1:
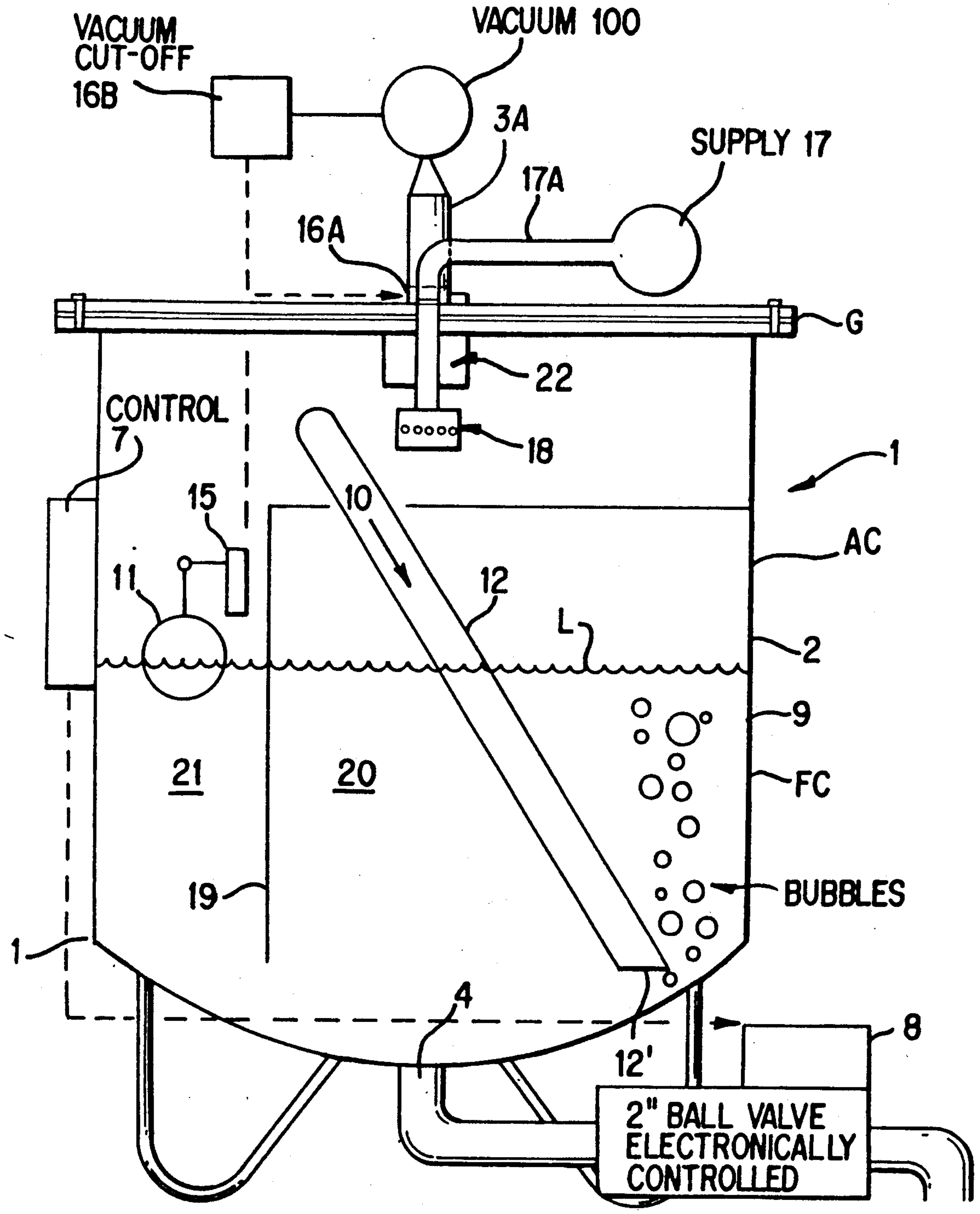
FIG. 1 is a side view of the separating system of one embodiment present invention.
Figure 2:
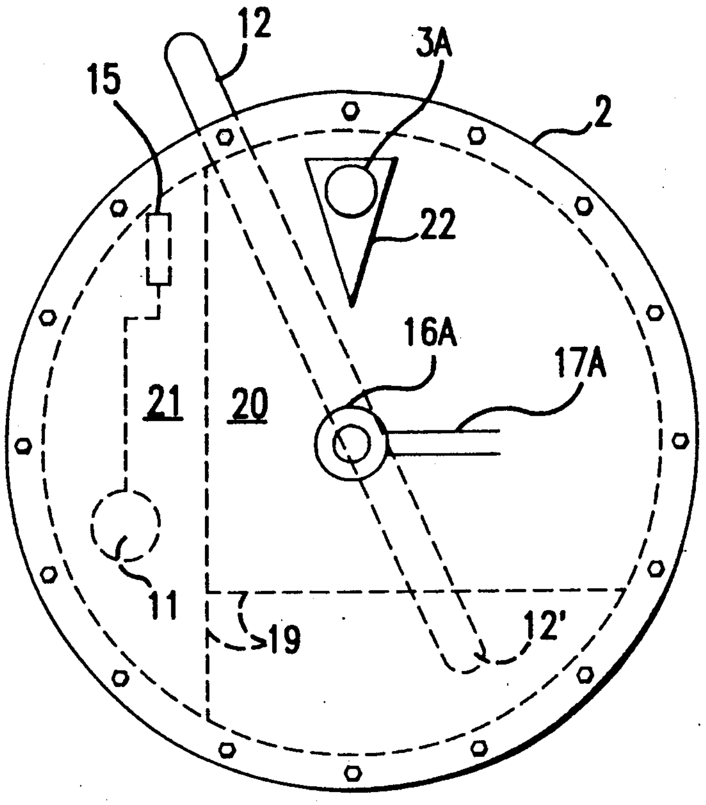
FIG. 2 is a top view of the FIG. 1 separating system of present invention.

Referring to FIGS. 1–2, the separator 1 of a first embodiment of the present invention comprises a closed tank or reservoir 2, preferably having cylindrical walls to facilitate cleaning. A flat cover 3 seals the reservoir 2 with a gasket G. The bottom of the reservoir 2 is preferably concave with a drain hole 4 being of a sufficient size to drain the reservoir 2 preferably at a rate faster than the time required for cleaning of the reservoir 2. The drain hole 4 is sealed by a normally closed drainage valve, such as a ball valve 5 through pipe 6. The ball valve 5 is electronically controlled by control box 7 through a control relay 8, as described below in more detail.

Further, the separator 1 includes an inlet 17A for introducing liquid material from a supply 17 into the reservoir 2 via a centrally located sprayer 18. The opening of the inlet 17A is controlled by a solenoid inlet valve 16A responsive to a signal from a level detection device, such as a float level 11 with a float switch 15, which outputs an inlet signal whenever the actual level of the liquid 9 drops below a predetermined level L. When activated, the inlet valve 16A opens and the inlet 17A permits introduction of liquid material into the reservoir 2 via the sprayer 18 which sprays the liquid generally parallel to the predetermined level L so as to impinge against the walls of the reservoir to clean them.

An air outlet 3A is provided through the cover 3 to provide communication between the reservoir 2 and the vacuum pump 100. A vacuum cutoff device 16B communicates with the level detection device so as to be responsive to the inlet signal from the level detection device. When the actual liquid level drops below the predetermined level L, the inlet signal is outputted to the vacuum cutoff device 16B which disables the vacuum pump.

The reservoir 2 contains a liquid 9, preferably consisting essentially of water, but may be any liquid which can provide adequate separating capability for whatever air/particulate mixture 10 is to be cleaned. The liquid filter 9 is filled to the predetermined level L set by the position of the float level 11 to define a chamber FC containing the liquid and an air chamber AC above the predetermined level L of the liquid. The liquid chamber FC communicates with the loading system 130 and the air chamber AC communicates with the vacuum pump 100. The air/particulate mixture 10 comprising a gas (preferably air) mixed with any trapped or contaminated particles from the loading system is drawn by the vacuum pump 120 through the filter 9 to trap particulate matter from the air/particulate mixture. In a preferred embodiment, the air/particulate mixture enters the liquid through an air inlet 12′ at the exit of an inclined suction pipe 12 which is below the surface level of the liquid 9 and preferably near the drain 4 at the base of the reservor 1, thereby allowing the air/particulate mixture to travel through the separating media for the maximum distance. Preferably, the air inlet 12′ is located generally diametrically opposite from the air outlet 3A. The particles in the air/particulate mixture 10 are trapped in the liquid 9, but the air travels into the air compartment AC of the reservoir 2 by the pressure differential caused by vacuum pump 100.

Periodically it is required that the separator system 1 be cleaned to remove accumulated contaminants from the reservoir walls and to replace the liquid 9 to provide for reliable, efficient separating and reduce the risk of having any contaminants destroy or plug any devices downstream of the separator, such as the vacuum pump 100. The present invention provides such cleaning which is automatically activated to reduce maintenance costs associated with manual cleaning, as well as increase productivity by allowing the system to be cleaned efficiently and timely through automatic cleaning. The present invention uses an automatic control 7 which may or may not be connected to a timer (not shown) for activating a cleaning cycle periodically depending on the specific application and environment of the separating system. Preferably, this is done 1 to 5 times per 24 hour period to provide the necessary degree of reliability of the separating system. The predetermined cleaning period may be set for any desired number of minutes, preferably 5 minutes, and may be activated at any particular time, for example at 10 AM.

Upon activation of the cleaning cycle by the control 7, the control 7 activates the control relay 8 to open the ball valve 5 for the predetermined time period to allow for draining of the media 9 and any trapped contaminants. As the liquid level diminishes, inside tank float switch 15 connected to float level 11 becomes closed to output the inlet signal which opens the inlet solenoid valve 16A allowing supply 17 to feed sprayer 18. The sprayer 18 has at least one nozzle and may be located anywhere above the liquid 9 so long as the sprayer 18 adequately supplies water to the walls of the reservoir 2 to wash down the walls with liquid 9 and thus remove any contaminants. Preferably, the sprayer 18 should be centrally located having a plurality of nozzles extending radially around the sprayer 18 to provide a horizontal radial spray pattern which can sufficiently wash down the walls of reservoir 2.

Simultaneously with opening of the inlet solenoid valve 16A, the inlet signal is received by the vacuum pump cutoff device 16B which disables vacuum pump 100, thus facilitating drainage of the reservoir and inhibiting suction of the water spray from the nozzle 18 into the vacuum pump 100.

After the predetermined time period, which is sufficient to drain the prior liquid material and clean the reservoir, the control 7 de-energizes control relay 8, thus closing the ball valve 5 and allowing the liquid level to rise to satisfy the float level 11. Upon return of the float level 11 to the predetermined level L, the inlet signal is discontinued so that the inlet solenoid valve 16A is de-energized and the supply 17 is shut off. The vacuum cutoff device 16B also responds to the discontinuation of the inlet signal to re-establish operation of the vacuum pump 100.

The present invention may further include perforated baffle plates 19 which partially separate the reservoir 2 into a separating section 20 and a separating media level detection section 21. Use of the baffle plates 19 allows for more accurate control and reliability of the float level 11 and float switch 15 by partially blocking any turbulence in the separating media due to the gaseous media being drawn through the suction pipe 12 and bubbling to the surface. Preferably, a pair of vertical baffle plates 19 as shown in FIGS. 1 and 2 are provided perpendicular to one another to separate the reservoir 2 into sections 20, 21 to further reduce turbulence and provide additional support for the baffle plates 19.

The level detection device is not limited to a mechanical float sensor 11 and float switch 15. An electronic liquid level sensor may be employed as a substitute for a mechanical level detection device. If an electronic sensor is used, the baffles 19 may be eliminated since turbulence has less impact on the electronic liquid level sensor.

In addition, a perforated baffle 22 may surround the air outlet 3A for the vacuum pump 100. The baffle further inhibits entry of water or dust into the air-outlet 3A.

Figure 4:
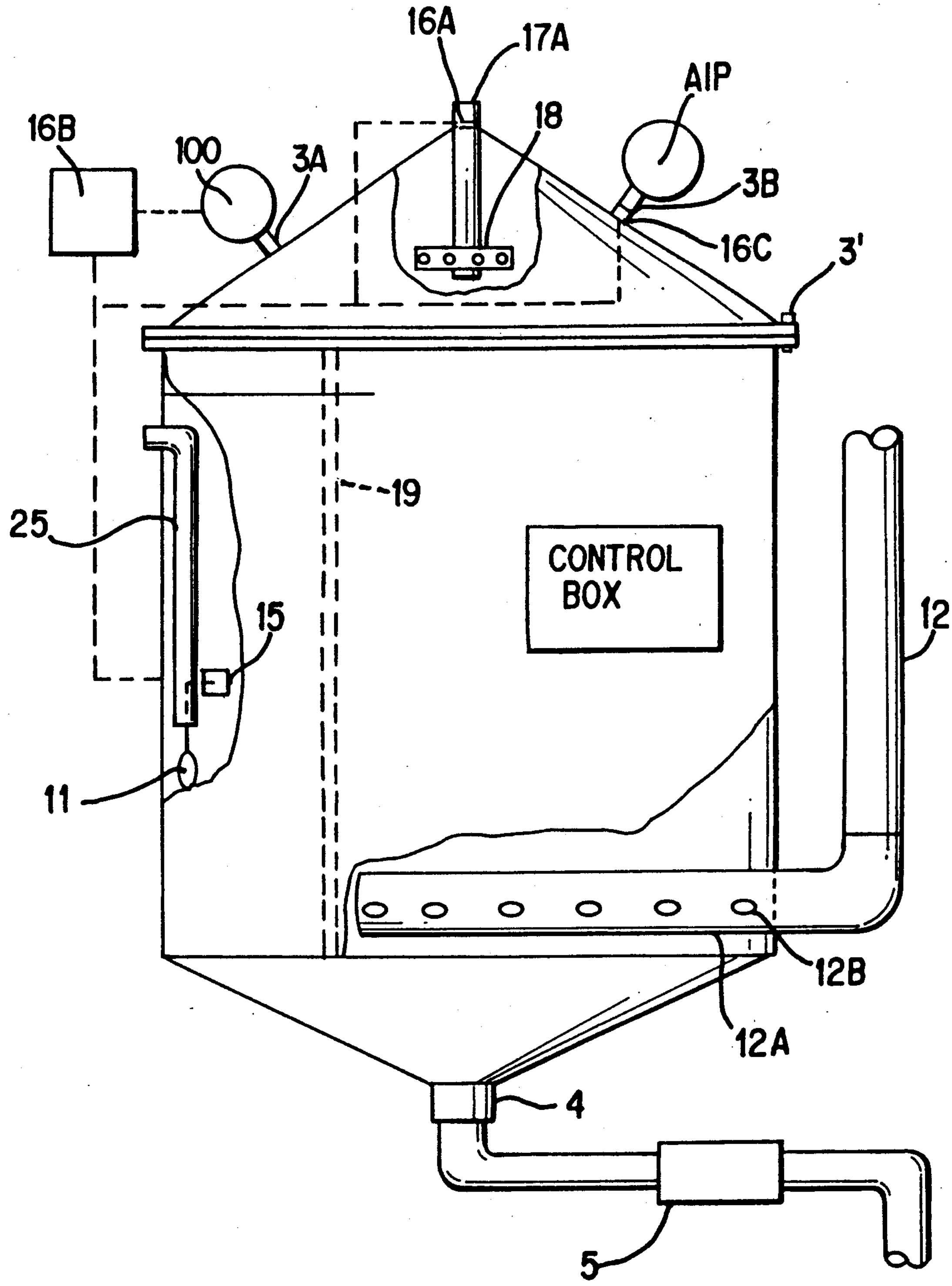
FIG. 4 is a partial cut-away side view of the separating system of a second embodiment of the present invention and FIG. 5 is a plan view of the separator system of a second embodiment of the present invention.
Figure 5:
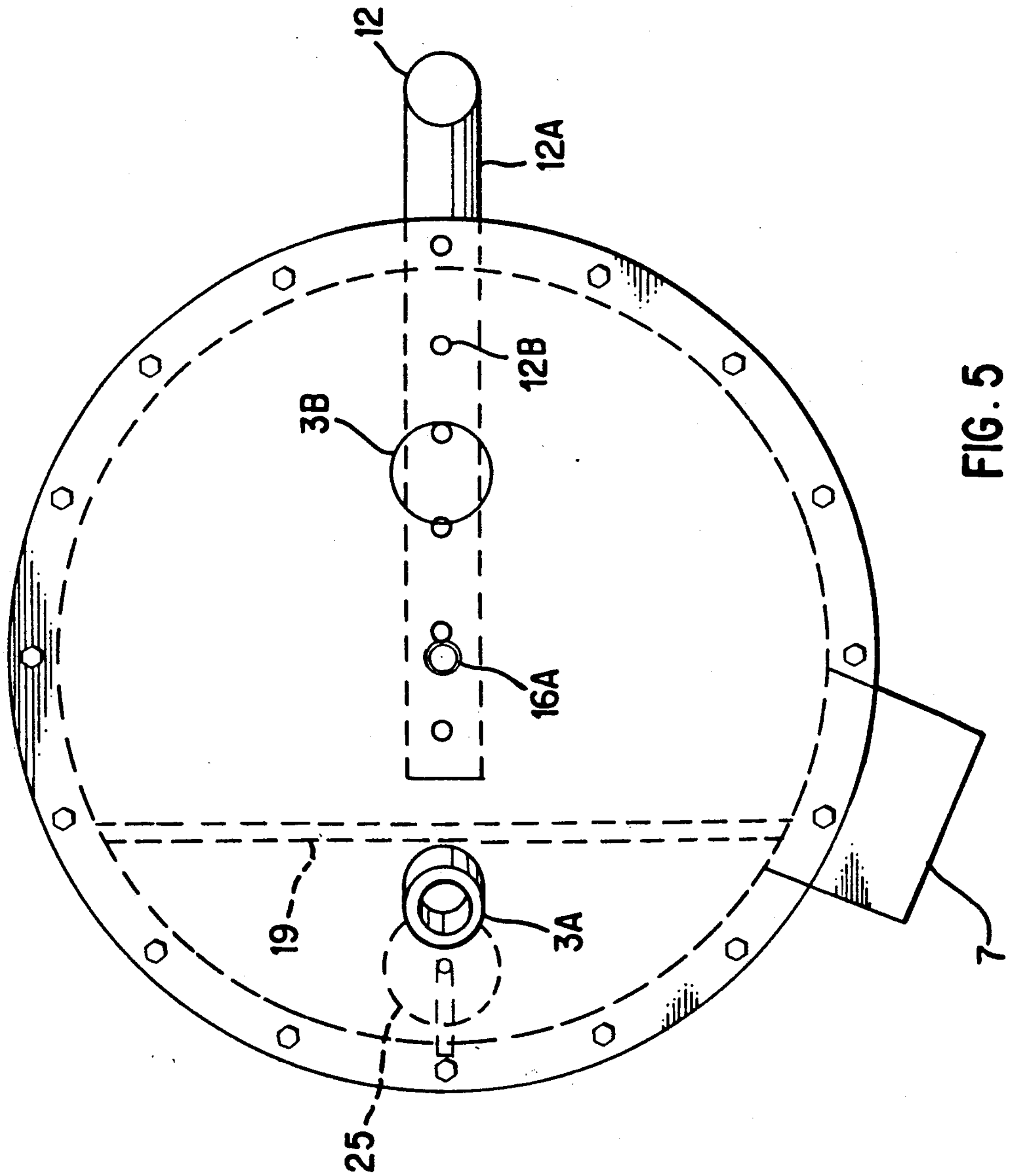

A second embodiment of the invention is illustrated in FIG. 4 and 5, with similar reference numbers being used for the items similar to that of the first embodiment in FIGS. 1–2. In the second embodiment, the cover 3′ and bottom are conical. The spray nozzle 18 is located within the conical cover 3′ to facilitate spray against the walls of the cover 3′ and runoff down the interior walls of the reservoir 2. Further, an air inlet solenoid valve 16C is located in an air inlet 3B of the cover 3′ and operatively communicates with the level detection device. Upon receipt of the inlet signal, the air inlet solenoid valve 16C opens the air inlet 3B to the atmosphere, thereby quickly eliminating the vacuum within the reservoir 2 and facilitating faster drainage of the liquid material due to equalized pressures inside and outside of the reservoir. The air inlet solenoid valve 16C closes when the predetermined liquid level is reestablished (i.e., when the inlet signal is discontinued) so that the vacuum in the reservoir can be resumed. The operation of the drain valve 5, inlet solenoid valve 16A, and vacuum cutoff device 16B in the second embodiment is the same as in the first embodiment.

In the second embodiment, the suction pipe 12 of the first embodiment is modified to include a horizontal suction pipe section 12A extending across the bottom of the reservoir adjacent the drain 4. The horizontal suction pipe section 12A includes a series of openings 12B, preferably on the bottom side of the section 12A closest to the drain 4 to maximize the travel of the air/particulate mixture. The horizontal suction pipe section 12A and the series of openings 12B provide more even distribution of the air/particulate mixture through the liquid and thus creates less turbulence, as opposed to the concentrated effect of the single inlet 12′ of the first embodiment.

As illustrated in FIG. 2, the float level 11 can be positioned within a conduit 25 to further minimize turbulence effects.

While the invention has been described with regard to the preferred embodiments, it is to be clearly understood by those skilled in the art that the invention is not limited thereto, and that changes and modifications may be made without departing from the scope of the invention as defined by the following claims.

I claim:

1. A separator for a vacuum loading system located in a flow path of an air/particulate mixture between a loading system and a vacuum pump, the separator comprising:

a closed reservoir defining an air chamber communicating with the vacuum pump and a liquid chamber communicating with the loading system, the vacuum pump drawing the air/particulate mixture from the loading system through an inlet in the liquid chamber to trap particulate matter in a liquid contained in the liquid chamber, air in the air/particulate mixture being drawn through the liquid and into the air chamber for withdrawal from an air outlet of the reservoir and return to the vacuum pump;

level detection means within the reservoir for detecting a predetermined level of the liquid in the reservoir and outputting an inlet signal when an actual liquid level is less than the predetermined level;

drain valve means in the liquid chamber of the reservoir for selectively draining the liquid from the reservoir;

inlet means operatively communicating with the level detecting means for selectively introducing the liquid into the reservoir in response to detection of the inlet signal;

vacuum cutoff means operatively communicating with the level detecting means for selectively disabling the vacuum pump in response to detection of the inlet signal; and control means for periodically opening the drain valve means for a predetermined time period to drain the liquid from the reservoir and thereby actuate the level detection means to output the inlet signal for opening the inlet means and activate the vacuum cutoff mean to disable the vacuum pump, the drain valve means closing upon completion of the predetermined time period, and the vacuum pump being restarted and the inlet means closing when the actual liquid level equals the predetermined liquid level.

2. The separator of claim 1, wherein the inlet means includes a spray nozzle centrally located in the air chamber for directing a spray of liquid in a direction generally parallel to the predetermined level of the liquid to impinge against interior walls of the reservoir to clean the reservoir.

3. The separator of claim 1 wherein the liquid is water.

4. The separator of claim 1 further comprising a perforated baffle dividing the liquid chamber into two sections, the level detection means being located in one section and the inlet for the air/particulate mixture located in the other section.

5. The separator of claim 1 further comprising a perforated baffle in the air chamber between the predetermined level of the liquid and the air outlet of the reservoir.

6. The separator of claim 1 further comprising a baffle plate surrounding the air outlet of the reservoir.

7. The separator of claim 1 wherein the air/particulate mixture is introduced into the liquid through an inclined suction pipe having the inlet in the liquid chamber for the air/particulate mixture adjacent to a base of the filter liquid chamber.

8. The separator of claim 1 wherein the reservoir has cylindrical interior walls and a location for the inlet for the air/particulate mixture in the liquid chamber is generally diametrically opposite to a location for the air outlet of the reservoir.

9. The separator of claim 1 further comprising:

an air inlet in the air chamber and air inlet valve means at the air inlet operatively communicating with the level detecting means for selectively opening the air inlet in response to detection of the inlet signal to permit introduction of external air into the air chamber, the air inlet valve means closing the air inlet when the predetermined level of liquid is reestablished.

10. The separator of claim 1, wherein the inlet means is located within a cover for the reservoir.

11. The separator of claim 1, wherein the inlet for the air particulate mixture is a suction pipe having a horizontal section adjacent the drain valve means, the horizontal section having a series of inlet openings for introduction of the air/particulate mixture into the liquid chamber.

12. A separator for a vacuum loading system located in a flow path of an air/particulate mixture between a loading system and a vacuum pump, the separator comprising:

a closed reservoir defining an air chamber communicating with the vacuum pump and a liquid chamber communicating with the loading system, the vacuum pump drawing the air/particulate mixture from the loading system through a series of inlet openings in the liquid chamber to trap particulate matter in a liquid contained in the liquid chamber, air in the air/particulate mixture being drawn through the liquid and into the air chamber for withdrawal from an air outlet of the reservoir and return to the vacuum pump;

level detection means within the reservoir for detecting a predetermined level of the liquid in the reservoir and outputting an inlet signal when an actual liquid level is less than the predetermined level;

first valve means in the liquid chamber of the reservoir for selectively draining the liquid from the reservoir;

inlet means operatively communicating with the level detecting means for selectively introducing the liquid into the reservoir in response to detection of the inlet signal;

vacuum cutoff means operatively communicating with the level detecting means for selectively disabling the vacuum pump in response to detection of the inlet signal;

second valve means in the air chamber and operatively communicating with the level detecting means for selectively opening the air chamber to external air in response to detection of the inlet signal; and control means for periodically opening the first valve means for a predetermined time period to drain the liquid from the reservoir and thereby actuate the level detection means to output the inlet signal for opening the inlet means and the second valve means and activating the vacuum cutoff means, the first valve means closing upon completion of the predetermined time period, and the vacuum cutoff means being deactivated and the inlet means and second valve means closing when the actual liquid level equals the predetermined liquid level.

13. The separator of claim 12, wherein the series of inlet openings are located adjacent the first valve means in a horizontal pipe section.

14. The separator of claim 12, wherein the inlet means is located within a cover for the reservoir.

* * * * *